(12) United States Patent
Altheimer et al.

(10) Patent No.: US 8,560,285 B2
(45) Date of Patent: Oct. 15, 2013

(54) RESCALING OF THE TARGET ASTIGMATISM FOR OTHER ADDITIONS

(75) Inventors: Helmut Altheimer, Baisweil-Lauchdorf (DE); Wolfgang Becken, Munich (DE); Robert Bichler, Krefeld (DE); Gregor Esser, Munich (DE); Martin Zimmermann, Erdweg-Kleinberghofen (DE); Jochen Brosig, Zorneding (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 385 days.

(21) Appl. No.: 12/933,360

(22) PCT Filed: Mar. 5, 2009

(86) PCT No.: PCT/EP2009/001571
§ 371 (c)(1),
(2), (4) Date: Oct. 27, 2010

(87) PCT Pub. No.: WO2009/115191
PCT Pub. Date: Sep. 24, 2009

(65) Prior Publication Data
US 2011/0208493 A1      Aug. 25, 2011

(30) Foreign Application Priority Data
Mar. 20, 2008   (DE) .................. 10 2008 015 189

(51) Int. Cl.
*G06G 7/48*      (2006.01)
(52) U.S. Cl.
USPC ............................................. 703/6; 351/169

(58) Field of Classification Search
USPC ............ 703/1, 6; 351/168, 169, 159.42, 177; 700/97; 715/772
See application file for complete search history.

(56) References Cited

U.S. PATENT DOCUMENTS

| | | | |
|---|---|---|---|
| 2,878,721 A | 3/1959 | Kanolt | |
| 5,854,669 A | 12/1998 | Altheimer et al. | |
| 6,199,983 B1 * | 3/2001 | Kato et al. | 351/159.42 |
| 6,366,823 B1 * | 4/2002 | Shirayanagi | 700/97 |
| 2003/0117578 A1 * | 6/2003 | Haimerl et al. | 351/177 |
| 2004/0095553 A1 * | 5/2004 | Dorsch et al. | 351/168 |
| 2006/0050235 A1 * | 3/2006 | Meron et al. | 351/169 |
| 2006/0176446 A1 * | 8/2006 | Kaga | 351/177 |
| 2007/0035696 A1 * | 2/2007 | Altheimer et al. | 351/169 |
| 2007/0132945 A1 | 6/2007 | Haser et al. | |
| 2007/0182923 A1 * | 8/2007 | Kitani et al. | 351/169 |
| 2007/0242220 A1 * | 10/2007 | Guilloux et al. | 351/177 |
| 2008/0158507 A1 * | 7/2008 | Altheimer et al. | 351/169 |
| 2008/0273170 A1 * | 11/2008 | Watanabe | 351/177 |
| 2008/0282183 A1 * | 11/2008 | Fisher et al. | 715/772 |
| 2008/0284978 A1 * | 11/2008 | Kaga | 351/169 |
| 2010/0157242 A1 * | 6/2010 | Esser et al. | 351/177 |

FOREIGN PATENT DOCUMENTS

| | | |
|---|---|---|
| DE | 195 11 613 A1 | 5/1996 |
| WO | WO 96/12984 | 5/1996 |
| WO | WO-2004/086125 A1 | 10/2004 |

* cited by examiner

*Primary Examiner* — Kandasamy Thangavelu
(74) *Attorney, Agent, or Firm* — Schiff Hardin LLP

(57) ABSTRACT

A fast and efficient method for calculating or producing a spectacle lens design, as well as a method for manufacturing a spectacle lens according to the thus calculated spectacle lens design. Furthermore, a corresponding device is provided for manufacturing a spectacle lens, as well as corresponding computer program products and storage media.

13 Claims, 12 Drawing Sheets

RESCALING OF THE TARGET ASTIGMATISM FOR OTHER ADDITIONS

The preferred embodiments described herein relate to a computer-implemented method for producing or calculating a design for a progressive spectacle lens by means of a transformation of a specified starting design, as well as to a method for producing a progressive spectacle lens according to the thus calculated design. Moreover, the preferred embodiments relate to corresponding devices, computer program products, storage media, and a use of a spectacle lens produced according to the method of the preferred embodiments herein.

BACKGROUND

A model or design-based optimization of a progressive spectacle lens (progressive lens) takes place by minimizing a target function in which desired values of one or more aberrations (e.g. refractive error, astigmatic error) are taken into account as target values. The target or desired values of the at least one aberration, and in particular of the astigmatic error, which are taken into account in the target function, characterize the design of a spectacle lens.

In order to produce lenses with different designs, i.e. different refractive power and/or astigmatism distributions, these different model or target values have to be created and optimization has to be performed therewith. According to the prior art, own desired specifications (designs) are created and deposited for each design to be newly developed. According to the conventional methods, approximately 72 to 84 different progressive designs per refractive index (material) are desired, which differ particularly in the addition and power in the distance reference point (distance portion power).

However, the creation and the logistics of the many different designs for the manufacturer are very cost and time-consuming.

SUMMARY

Accordingly, the disclosure herein provides a fast and efficient method for calculating or producing a spectacle lens design, as well as a method for manufacturing a spectacle lens according to the thus calculated spectacle lens design. Furthermore, the disclosure herein provides a corresponding device for manufacturing a spectacle lens, as well as corresponding computer program products and storage media.

BRIEF DESCRIPTION OF THE DRAWINGS

In the following, the disclosure herein will be exemplarily described with reference to the figures, which show:

FIG. 4a illustrates an example of a progressive spectacle lens with an addition of 1.5 D, showing the design of the spectacle lens derived from the design shown in FIG. 3a.

DETAILED DESCRIPTION

Figure 1:
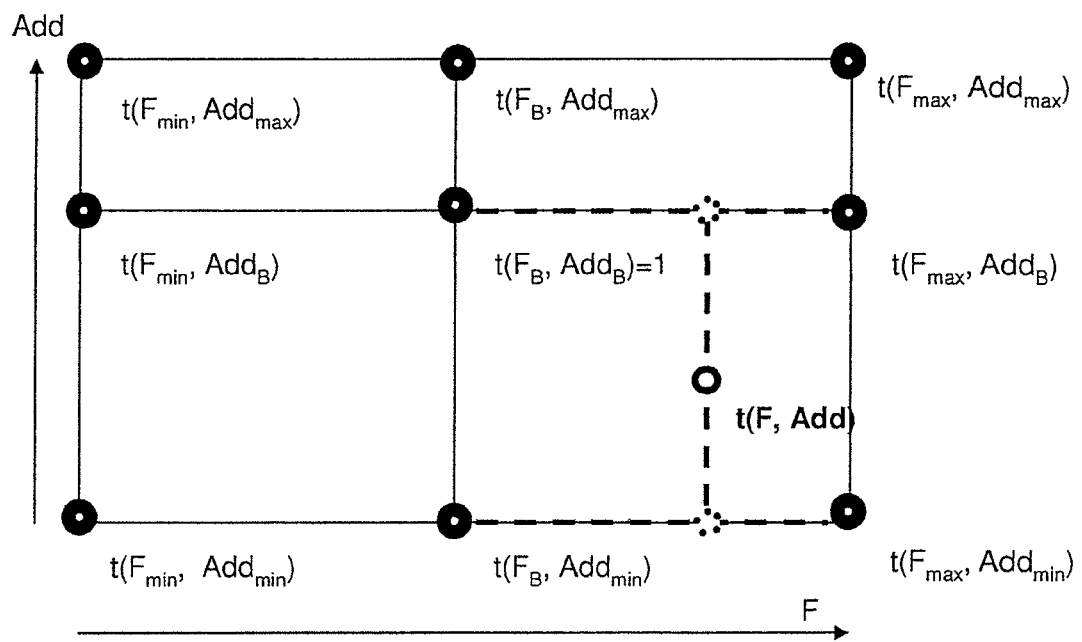
FIG. 1 illustrates an exemplary approach in calculating the values of the function t by means of interpolation in accordance with an exemplary embodiment.

According to the exemplary embodiment, a computer-implemented method for (automatically) producing or calculating a design for a progressive spectacle lens with an addition Add is proposed, wherein the design comprises a desired astigmatism distribution $A_{Add}$ (u, y) for the addition Add, comprising the following steps:

setting a starting design comprising:
  specifications for the course of a principal line;
  a starting desired astigmatism distribution $A_{Add_B}$ (u, y) for a specified base addition $Add_B$, wherein $Add_B \neq Add$;
calculating the desired astigmatism distribution $A_{Add}$ (u, y) for the addition Add by means of a transformation of the starting desired astigmatism distribution $A_{Add_B}$ (u, y), wherein the transformation of the starting desired astigmatism distribution $A_{Add_B}$ (u, y) comprises a multiplication $s A_{Add_B}$ (u, y) of the starting desired astigmatism distribution $A_{Add_B}$ (u, y) by a scaling factor s, and wherein $$s = t \frac{Add}{Add_B};$$

t designates a factor which is a function $t = t(Add, F, Add_B)$ of the specified addition Add and/or the distance portion power F and/or the base addition $Add_B$, wherein $t=1$ holds true for $Add = Add_B$; and x designates the horizontal coordinate;

y designates the vertical coordinate; and u designates the horizontal distance of a point (x, y) from the principal line, wherein $u=0$ holds true on the principal line.

The optimization of progressive spectacle lenses usually takes place by minimizing a target function in which target or desired values for at least one aberration (in particular target values for the astigmatic deviation) of the progressive spectacle lens are taken into account. The target or desired values of the at least one aberration, and in particular of the astigmatic deviation, which are taken into account in the target function, characterize the design of a spectacle lens.

A design-based optimization of a progressive spectacle lens may take place by minimizing a target function of the form:

$$F(\vec{x}) = \sum_{i=1}^{m} [g_{i,Ast}(Ast_i - Ast_{i,Soll})^2 + \ldots ]$$

or of the form:

$$F(\vec{x}) = \sum_{i=1}^{m} [g_{i,\Delta R}(\Delta R_i - \Delta R_{i,Soll})^2 + g_{i,Ast}(Ast_i - Ast_{i,Soll})^2 + \ldots ]$$

In the above formulae:

$\Delta R_{i,Soll}$ is the desired value of the local refractive error at the $i^{th}$ evaluation point;

$\Delta R_i$ is the actual local refractive error at the $i^{th}$ evaluation point;

$Ast_{i,Soll}$ is the desired value of the local astigmatic deviation or the local astigmatic error at the $i^{th}$ evaluation point;

$Ast_i$ is the actual local astigmatic deviation or the actual local astigmatic error at the $i^{th}$ evaluation point;

$g_{i,\Delta R}$ is the local weighing of the refractive error at the $i^{th}$ evaluation point;

$g_{i,Ast}$ is the local weighing of the astigmatic deviation or the astigmatic error at the $i^{th}$ evaluation point.

The refractive error represents the difference between the refractive power of the spectacle lens and the refractive power determined by means of refraction determination. The astigmatic deviation or the astigmatic error represents the difference between the astigmatism of the spectacle lens and the astigmatism determined by means of refraction determination. Preferably, these are values in the position of wear of the spectacle lens, i.e. taking the system spectacle lens/eye into consideration.

The spatial distribution of the desired values of the aberrations (in particular the astigmatic error) across the spectacle lens, which are taken into account as target values in the optimization of the spectacle lens, and optionally their local weighing characterize the design of a progressive spectacle lens. Stated differently, the design of a spectacle lens usually comprises the distribution of the desired values for one or more aberrations (in particular the astigmatic error), which are taken into account as target values in the optimization of the spectacle lens.

Here, in particular the principal line and the spatial distribution of the desired values of the astigmatic error across the spectacle lens play a central role in the design setting and optimization of progressive spectacle lenses. For example, the classification of the progressive lens design and the assessment of the field of view parameters suitably take place on the basis of the astigmatism distribution or the distribution of the astigmatic error. The demarcation of the inner zones with good imaging properties from the peripheral zones where higher errors are allowed is usually achieved with a specified desired iso-astigmatism line. In eyewear optics, mostly the iso-astigmatism line along which the amount of astigmatism is equal to 0.5 D is used to this end.

Therefore, a design of a spectacle lens as defined by this application comprises the spatial distribution of the desired values of the astigmatism or the astigmatic deviation of the spectacle lens across the optimization area of the progressive spectacle lens (i.e. preferably in an area having a diameter of at least ±20 mm, preferably ±40 mm around the origin of the selected coordinate system). In this application, the spatial distribution of the desired values of the astigmatism or the astigmatic deviation of the spectacle lens across the optimization area of the progressive spectacle lens is shortly referred to as desired astigmatism distribution.

Furthermore, a spectacle lens design may also comprise the distribution of the desired values for refractive error, magnification error, distortion error or other aberrations. These may be surface values or preferably values in use, i.e. values in the position of wear of the spectacle lens.

In addition, the spectacle lens design may comprise a suitable object distance model. For example, the object distance model may comprise an object distance function defined as the reciprocal object distance along the principal line. A standardized object distance model is indicated e.g. in DIN 58 208 part 2 (cf. image 6). However, the object distance model may deviate from this standardized object distance model.

Accordingly, the design calculation can further comprise the calculation of further desired values and/or design parameters for the spectacle lens.

In order to produce progressive spectacle lenses with different designs (i.e. with different desired specifications for the aberrations, in particular for the astigmatic deviation), the corresponding different design or desired specifications have to be produced or calculated, and optimization has to be performed subsequently. Consequently, producing or calculating a design for a progressive spectacle lens with a specified addition Add as defined by this application comprises calculating or producing the desired specifications or desired values for the individual aberrations to be assigned to the spectacle lens design, in particular the desired specifications for the astigmatic deviation or desired astigmatism for the specified addition.

Conventionally, several desired specifications (designs) are individually created and deposited for each spectacle lens or spectacle lens series to be newly developed. Usually, different designs are provided for each addition and for several specified power ranges. However, the creation of suitable desired specifications or designs and their logistics are very cost and time-consuming.

Contrary to the usual procedure, according to the exemplary embodiment, the new desired specifications for arbitrary additions are derived from already deposited, older desired specifications for a predetermined base addition by means of a simple transformation comprising a multiplication by a scaling factor. The approach according to the exemplary embodiment provides surprisingly good results—despite the simple methodology:

First of all, a starting design (hereinafter also referred to as base design) is set or produced for a specified base addition $Add_B$ (e.g. a medium addition). In particular, the starting design comprises a specified starting desired astigmatism distribution for the specified base addition $Add_B$. Moreover, the starting design comprises specifications for the course of a principal line.

The principal line is understood to be a substantially straight or winding line along which the intended increase in the refractive value of the spectacle lens from the distance to the near portion is achieved. The principal line is substantially centered with respect to the spectacle lens top down, i.e. along a substantially vertical direction. Thus, the principal line constitutes a construction line in the coordinate system of the (object-side or eye-side) to-be-optimized surface for the description of the desired values. The course of the principal line of the spectacle lens is selected such that it at least approximately follows the principal line of sight. A method for matching the principal line to the principal line of sight is e.g. described in EP 1 277 079. A principal line of sight is understood to be the sequence of the penetration points of the main rays through the respective spectacle lens surface when looking at one line lying in the perpendicular plane that splits the distance of the two ocular centers of rotation in half (so-called cyclopean eye plane). The spectacle lens surface may be the object-side or the eye-side surface. The position of the line in the cyclopean eye plane is determined by the selected object distance model.

The desired astigmatism distributions for all other additions Add≠$Add_B$ are obtained by a simple rescaling of the specified starting desired astigmatism distribution (hereinafter also referred to as base desired astigmatism distribution) as a function of the addition. In a preferred embodiment, the desired iso-astigmatism lines of the starting desired astigmatism distribution are simply assigned other values. For example, the 1.25 D desired iso-astigmatism line of the desired astigmatism distribution for addition of 2.5 D simply becomes the 0.5 D desired iso-astigmatism line of the desired astigmatism distribution for addition of 1.0 D.

Surprisingly, it has turned out that this simple and thus fast and efficient method allows producing designs for arbitrary additions while maintaining the design characteristics or design properties of the starting design.

The starting design can be set for a specified or specifiable power range. The power range for the starting design can vary within broad limits. In an extreme case, one single starting design may be set for the entire power range of a product line, e.g. for a power range from −10 to +10 D. Alternatively, one starting design for the minus range (i.e. for power<0 D) and one starting design for the plus range (i.e. for power>0 D) can be set each. In another preferred embodiment, several starting designs are set for the minus and plus ranges each. The power range for which a starting design is set may be a power range of 10 D, of 5 D, or of 3 D. Other power ranges are possible as well.

The desired astigmatism distribution can be indicated in a suitable coordinate system, for example in a Cartesian coordinate system $\{x, y\}$ (i.e. in the form $A_{Add}(x, y)$ or $A_{Add_B}(x, y)$) or preferably in a coordinate system of the spectacle lens surface to be optimized, which is related to the principal line (i.e. in the form $A_{Add}(u, y)$ or $A_{Add_B}(u, y)$).

Here, the coordinate system $\{x, y\}$ for example relates to a (Cartesian) coordinate system in the (object-side or eye-side) surface of the spectacle lens to be optimized, wherein the origin of the coordinate system e.g. coincides with the geometric center of the (raw-round) spectacle lens or with the centration or fitting point of the spectacle lens. The vertical ("y") and horizontal ("x") axes lie in the tangential plane with respect to the respective (eye-side or object-side) surface of the spectacle lens in the geometric center or the centration or fitting point. The vertical direction preferably relates to the vertical direction in the position of wear of the spectacle lens, wherein the spectacle lens is for example disposed in an average position of wear (as is defined e.g. in DIN 58 208 part 2) or in an individual position of wear. Preferably, the spectacle lens is disposed in an individual position of wear.

Of course, it is possible to indicate the spatial distribution of the aberrations in other suitable coordinate systems. In particular, it is preferred to indicate the desired astigmatism distribution (and other optimization values) in the coordinate system of the surface to be optimized with respect to the principal line (wherein u=0 holds true on the principal line), and not with respect to the y axis (x=0).

Accordingly, a coordinate transformation $\{x, y\} \rightarrow \{u, y\}$, $x=x_{HL}+u$ is performed, and all calculations are made in the coordinate system $\{u, y\}$. Here, u designates the horizontal distance of a point (x, y) from the predetermined principal line and $x_{HL}$ designates the horizontal coordinate of a point on the principal line. In the coordinate system $\{u, y\}$, the points of the principal line have coordinates (u=0, y). The horizontal coordinate $x_{HL}$, of a point on the principal line may be a one-dimensional function of the vertical coordinate y, i.e. $x_{HL}=f_{HL}(y)$ By specifying the function $f_{HL}(y)$, the course of the principal line is specified.

If the desired specifications or the optimization desired values are specified with respect to the principal line, it is sufficient—the position of wear of the spectacle lens to be taken into account, in particular if the pupillary distance, the corneal vertex distance, the forward inclination, the object distance model, etc. change(s)—to merely match the principal line to the changed principal line of sight. The desired values or the optimization desired values are then adjusted automatically.

Moreover, the calculation of the design may comprise the calculation of further desired specifications and/or design parameters for the spectacle lens.

Accordingly, the starting design can comprise spatial distributions of the desired values of further optical properties or abberations (e.g. refractive power or refractive error, magnification, distortion, RMS ("root mean square") of the wave aberration function, HOA ("higher order aberrations" or aberrations of higher order, such as coma, spherical aberration, etc.)) and/or further optimization parameters (e.g. number and position of the evaluation points, size of the optimization grid, local weighings of the evaluation points, relative local weighings of the desired values with respect to each other, etc.). Accordingly, calculating or producing a design for a spectacle lens can comprise calculating or producing the desired specifications or desired values for further aberrations to be assigned to the individual spectacle lens design (e.g. refractive power or refractive error). The further optical properties or aberrations, such as refractive power or refractive error, magnification, distortion, RMS, HOA, etc., can directly be incorporated into the target function.

Preferably, the additional desired specifications and/or optimization parameters of the starting design remain unchanged.

The result of the multiplication of the starting desired astigmatism distribution $A_{Add_B}(u, y)$ by the scaling factor s preferably directly results in the to-be-calculated desired astigmatism distribution $A_{Add}(u, y)$ of the design for a progressive spectacle lens with the addition Add. In other words, it holds true that:

$$A_{Add}(u,y)=sA_{Add_B}(u,y)$$

However, the transformation of the starting desired astigmatism distribution $A_{Add_B}(u, y)$ can comprise further transformations $\Im$ of the starting desired astigmatism distribution $A_{Add_B}(u, y)$, e.g.:

$$A'_{Add}(u,y)=sA_{Add_B}(u,y); \text{ and}$$

$$A_{Add}(u,y)=\Im(A'_{Add}(u,y)).$$

For example, it is possible to transform the starting desired astigmatism distribution $A'_{Add}(u, y)=sA_{Add_B}(u, y)$, which is multiplied by a scaling factor, further in dependence on variably adjustable, vertical positions of the distance and/or near reference point(s) such that the spectacle lens design to be calculated exhibits the desired position of the distance and/or near reference point(s). Here, a spectacle lens design exhibits a predetermined spatial position of the distance and/or near reference point(s) when the prescribed values or the values desired for the spectacle wearer for the distance and/or near portion power(s) (which are e.g. determined by means of refraction determination) are achieved in the respective reference point. Put differently, the aberrations (in particular astigmatic deviation and refractive error) assigned to design are to be as small as possible (preferably substantially zero) in the distance and/or near reference point(s). The further transformation $\mathfrak{I}$ may comprise a stretching or compression, or squeezing, of the desired astigmatism distribution $A'_{Add}(u, y)$ in the vertical direction. Such a transformation in the vertical direction is described in the patent application PCT/EP2008/000585.

With the factor t, design-specific differences with respect to addition and distance portion power can be taken into account in a relatively simple manner. In general, the factor t can be a function of the addition Add, the distance portion power F, and the base addition $Add_B$.

The values of the function $t(F, Add, Add_B)$ can be determined by means of a two-dimensional interpolation between predetermined limits of the function t. The function $t=t(Add, F, Add_B)$ can e.g. be represented as a suitable two-dimensional function $t=t(a, f)$ of the variables $a=Add-Add_B$ and $f=F-F_B$, wherein $F_B$ is a predetermined base distance portion power. The Taylor expansion of the function $t=t(a, f)$ then has the form:

$$t = t_0 + t_{10}f + t_{01}a + t_{20}f^2 + t_{02}a^2 + t_{11}fa + \ldots,$$

with the coefficients $t_0, t_{10}, t_{01}, t_{20}, t_{02}, t_{11}, \ldots$.

Suitable two-dimensional functions are e.g. described in the book "Table Curve 3D", ISBN 1-56827-199-9.

The values of the function $t=t(Add, F, Add_B)$ for an addition Add and a distance portion power F can be determined by means of a two-dimensional interpolation or extrapolation between predetermined benchmarks or limits for the function t. For example, the benchmarks or limits $t_1=t(F_{min}, Add_{min})$, $t_2=t(F_B, Add_{min})$, $t_3=t(F_{max}, Add_{min})$, $t_4=t(F_{min}, Add_B)$, $t_5=t(F_B, Add_B)$, $t_6=t(F_{max}, Add_B)$, $t_7=t(F_{min}, Add_{max})$, $t_8=t(F_B, Add_{max})$, $t_9=t(F_{max}, Add_{max})$ can be specified, and the intermediate values of the function $t(F, Add)$ or $t(f, a)$ can be determined by means of an interpolation (e.g. a linear, quadratic, or cubic interpolation).

The factor t can also be a function $t=t(Add, Add_B)$ merely of the specified addition and the base addition. Thus, for example design-specific differences with respect to the addition in one power range can be taken into account in a relatively simple manner.

The above explanations with respect to the general function $t=t(Add, F, Add_B)$ analogously apply to the function $t=t(Add, Add_B)$, provided that the function t is a function of an independent variable. For example, the values $t=t(Add, Add_B)$ for an arbitrary addition Add can be determined by means of an interpolation (e.g. a linear, quadratic, cubic, or other suitable interpolation) between the predetermined limits $t_1=t(Add_{max}, Add_B)$ and $t_2=t(Add_{min}, Add_B)$.

In a simple case, the factor t can be a constant, for example the condition $t=const=1$ can be satisfied. In this case, the scaling factor is $$s = \frac{Add}{Add_B}.$$

It has turned out that despite the simplicity of this transformation, it is possible to obtain designs for different additions thus maintaining the design characteristics of the starting design.

The method for producing or calculating a design for a progressive spectacle lens can further comprise a step of adjusting power-specific spectacle parameters. The power-specific spectacle parameters comprise the base curve, the thickness reduction prism, the lens thickness and/or the refractive power increase.

The adjustment may take place in advance by means of approximation calculations with deposited intermediate designs. The base curve value specification or base curve value can e.g. be determined from a database or depending on specific properties of the spectacle lens, such as the minimal back surface curvature. The base curve value can in particular be specified depending on the prescription values (shp, cyl, axis, addition) and individual values, such as corneal vertex distance (CVD), and be deposited in a database. The thickness reduction prism can e.g. be selected from a plurality of thickness reduction prisms (stored e.g. in form of a table), which have been determined in advance, be determined with a precalculation, and be matched during the optimization.

According to the exemplary embodiment, a device for producing or calculating a design for a progressive spectacle lens with an addition Add is further provided, which is suitable for performing a preferred method according to the exemplary embodiment. The design to be calculated comprises a desired astigmatism distribution $A_{Add}(u, y)$ for the addition Add.

The device comprises:
means for specifying a starting design, comprising:
  specifications for the course of a principal line;
  a starting desired astigmatism distribution $A_{Add_B}(u, y)$ for a specified base addition $Add_B$, wherein $Add_B \neq Add$; and
calculating means adapted to perform a calculation of the desired astigmatism distribution $A_{Add}(u, y)$ for the addition Add by means of a transformation of the starting desired astigmatism distribution $A_{Add_B}(u, y)$, wherein the transformation of the starting desired astigmatism distribution $A_{Add_B}(u, y)$ comprises a multiplication $sA_{Add_B}(u, y)$ of the starting desired astigmatism distribution $A_{Add_B}(u, y)$ by a scaling factor s, wherein $$s = t\frac{Add}{Add_B};$$

t designates a factor which is a function $t=t(Add, F, Add_B)$ of the specified addition Add and/or the distance portion power F and/or the base addition $Add_B$, wherein $t=1$ holds true for $Add=Add_B$; and
x designates the horizontal coordinate;
y designates the vertical coordinate; and
u designates the horizontal distance of a point (x, y) from the principal line.

Furthermore, the device can comprise
first storage means adapted to store the starting design or the starting desired astigmatism distribution $A_{Add_B}(u, y)$; and or
second storage means adapted to store the (derived) design or the derived desired astigmatism distribution $A_{Add}(u, y)$ Furthermore, the device for producing or calculating a design for a progressive spectacle lens preferably comprises detecting means adapted to detect individual data of the spectacle wearer.

Moreover, according to the exemplary embodiments, a computer program product and a storage medium with a computer program stored thereon are provided, wherein the computer program product or the computer program is adapted, when loaded and executed on a computer, to perform a preferred method for producing or calculating a design for a progressive spectacle lens.

Furthermore, according to the exemplary embodiments, a method for manufacturing an individual progressive spectacle lens with a specified addition Add is provided, comprising the steps of:
  calculating a design for the progressive spectacle lens with the addition Add according to a preferred method for producing or calculating a design for a progressive spectacle lens; and
  calculating or optimizing the progressive spectacle lens according to the calculated design.

As explained above, the (design-based) calculation or optimization of the progressive spectacle lens preferably takes place by minimizing a target function in which the desired astigmatism values, which have been determined in advance by means of a preferred method for producing or calculating a design for a progressive spectacle lens, and optionally further desired values are taken into account as target values.

Furthermore, the manufacturing method comprises:
  providing surface data of the calculated or optimized spectacle lens; and
  producing the spectacle lens according to the provided surface data of the spectacle lens.

The production or machining can take place by means of numerically controlled CNC machines, by means of a casting method, a combination of the two methods, or according to another suitable method.

The calculation or optimization of the spectacle lens can in particular take place taking individual data of the spectacle wearer into consideration.

The individual data of a spectacle wearer, i.e. the individual parameters and/or the individual needs of a spectacle wearer, can be obtained in great detail e.g. with a consulting tool, such as "Consulting FreeSign" of the company Rodenstock GmbH.

Moreover, according to the exemplary embodiments, a device for manufacturing a progressive spectacle lens with a specified addition Add is provided, comprising:
  design calculating means adapted to calculate a design for the progressive spectacle lens with the addition Add according to a preferred method for producing or calculating a design; and
  optimizing or calculating means adapted to perform a calculation or optimization of the progressive spectacle lens according to the calculated design.

In particular, the design calculating means comprise:
  means for specifying a starting design comprising specifications for the course of a principal line; and a starting desired astigmatism distribution $A_{Add_B}(u, y)$ for a specified base addition $Add_B$, wherein $Add_B \neq Add$; and
  calculating means adapted to perform a calculation of the desired astigmatism distribution $A_{Add}(u, y)$ for the addition Add by means of a transformation of the starting desired astigmatism distribution $A_{Add_B}(u, y)$, wherein the transformation of the starting desired astigmatism distribution $A_{Add_B}(u, y)$ comprises a multiplication $sA_{Add_B}(u, y)$ of the starting desired astigmatism distribution $A_{Add_B}(u, y)$ by a scaling factor s,
wherein:

$$s = t\frac{Add}{Add_B};$$

$t=t(Add, F, Add_B)$ designates a factor which is a function of the specified addition Add and/or the distance portion power F and/or the base addition $Add_B$, wherein $t=1$ holds true for $Add=Add_B$;
x designates the horizontal coordinate;
y designates the vertical coordinate;
u designates the horizontal distance of a point (x, y) from the principal line.

Furthermore, the design calculating means can comprise
  first storage means adapted to store the starting design or the starting desired astigmatism distribution $A_{Add_B}(u, y)$; and or
  second storage means adapted to store the (derived) design or the derived desired astigmatism distribution $A_{Add}(u, y)$.

Furthermore, the device for manufacturing a spectacle lens can comprise machining means for finishing the spectacle lens. For example, the machining means can comprise CNC machines for directly machining a blank.

Preferably, the finished spectacle lens has a simple spherical or rotationally symmetric aspherical surface and a progressive surface optimized according to the design specifications calculated according to the exemplary embodiments and optionally individual parameters of the spectacle wearer. Preferably, the spherical or rotationally symmetric aspherical surface is the front surface (i.e. the object-side surface) of the spectacle lens. Of course, it is also possible to dispose the progressive surface on the front surface of the spectacle lens. It is also possible for both surfaces of the spectacle lens to be progressive surfaces.

Furthermore, the device for manufacturing an individual progressive spectacle lens can comprise detecting means for detecting individual data of the spectacle wearer, which comprise particularly data regarding the dioptric power of the spectacle lens individually desired for the spectacle wearer.

According to a further aspect of the exemplary embodiments, a computer program product and a storage medium with a computer program stored thereon are proposed, wherein the computer program product or the computer program is adapted, when loaded and executed on a computer, to perform a method for calculating and optimizing a progressive spectacle lens with a specified addition Add, wherein the method comprises the following steps:
  calculating a design for the progressive spectacle lens with the addition Add according to a preferred method for producing or calculating a design for a progressive spectacle lens;
  calculating or optimizing the spectacle lens according to the calculated design.

According to a further aspect of the exemplary embodiments, a use of a spectacle lens, manufactured according to a preferred manufacturing method, in a specified average or individual position of wear of the spectacle lens in front of the eyes of a specific spectacle wearer for correcting a visual defect is provided.

Since different design variants can be tested against each other in a fast and efficient manner by means of the inventive method, the effort for the development of conventional, power-optimized or individual progressive spectacle lenses can be reduced considerably. Thus, design variants for e.g. wearer trials can e.g. be produced quickly and efficiently, since merely one addition per power range has be prepared in advance. The designs for all further additions are derived from this starting or base design by means of a simple transformation.

A further advantage of the inventive method is that the design characteristics or design properties can be maintained.

For example, it is possible to achieve a design preservation of almost 100% within the different additions for a power range.

In particular, the width of the viewing zones and the height of the maximally occurring astigmatism are closely related to the refractive power increase or addition of the progressive spectacle lens. The lower the addition, the smaller the maximally occurring astigmatism and the wider the viewing zones. Particularly in the case of lower additions, this can lead to problems in the construction and specification of desired iso-astigmatism lines, since e.g. a value of e.g. 0.5 D is often much too high. This problem does not occur with the inventive method for producing or calculating a design for a progressive spectacle lens. The desired iso-astigmatism lines of the transformed design can be obtain by a simple scaling of the specified desired iso-astigmatism lines of the starting of base design.

Design-specific differences with respect to the addition and optionally distance portion power can be taken into account by the factor t in a simple and efficient manner.

Also, no cost and time-consuming and error-prone, multi-dimensional interpolation according to power and addition between preset designs or desired distributions, in particular desired astigmatism distributions, is necessary any more. A linear interpolation between two starting designs of different power might be possible at most.

Preferably, the actual additions are taken into consideration in the calculation of the scaling factor s. Stated differently, the additions $Add_B$ and Add are the actual additions of the respective spectacle lens or spectacle lens design. The actual addition is defined as the difference of the spectacle lens power in the near reference point and the spectacle lens power in the distance reference point. The nominal addition relates to the addition of the refraction determination. In particular in near-vision lenses, in which the power in the distance reference point is not calculated for indefinite object distances but for closer objects, part of the addition is already present in the distance reference point. Accordingly, the desired addition is smaller than the nominal addition.

FIG. 1 illustrates an exemplary approach in calculating the values of the function t by means of interpolation. The benchmarks or limits $t_1=t(F_{min},Add_{min})$, $t_2=t(F_B,Add_{min})$, $t_3=t(F_{max},Add_{min})$, $t_4=t(F_{min},Add_B)$, $t_5=t(F_B,Add_B)$, $t_6=t(F_{max},Add_B)$, $t_7=t(F_{min},Add_{max})$, $t_8=t(F_B,Add_{max})$, $t_9=t(F_{max},Add_{max})$ are specified, and the intermediate values of the function t(F,Add) or t(f,a) are determined by means of interpolation (e.g. linear interpolation).

In all FIGS. 2 to 7, the coordinate system relates to the above-described Cartesian coordinate system {x, y} of the eye-side surface of the spectacle lens to be optimized, wherein the x coordinate in mm is plotted on the abscissa and the y coordinate in mm is plotted on the ordinate. What is shown are iso-astigmatism lines of the astigmatism in the position of wear of the spectacle lens (i.e. of the astigmatism of the system spectacle lens/eye) with a distance of 0.25 D. The origin of the coordinate system coincides with the geometric center of the raw-round spectacle lens.

The position of wear, for which the astigmatism has been calculated, is characterized by the following parameters.
 face form angle 4°
 forward inclination 9°
 pupillary distance 64 mm
 corneal vertex distance 13 mm
 object distance model:
  $A1(B_F)=0.0$ D; $A1(B_N)=-2.5$ D for FIGS. 2, 3 and 4;
  $A1(B_F)=-0.4$ D; $A1(B_N)=-2.5$ D for FIGS. 5 and 6;
  $A1(B_F)=-0.4$ D; $A1(B_N)=-3.0$ D for FIG. 7,
wherein A1 designates the reciprocal object distance.

Of course, it is possible to take other positions of wear into consideration.

In FIGS. 2 to 7, the sign $B_F$ designates the distance reference point, the sign $B_Z$ the centration or fitting point, the sign $B_N$ the near reference point, and the sign HL the principal line.

Figure 2A:
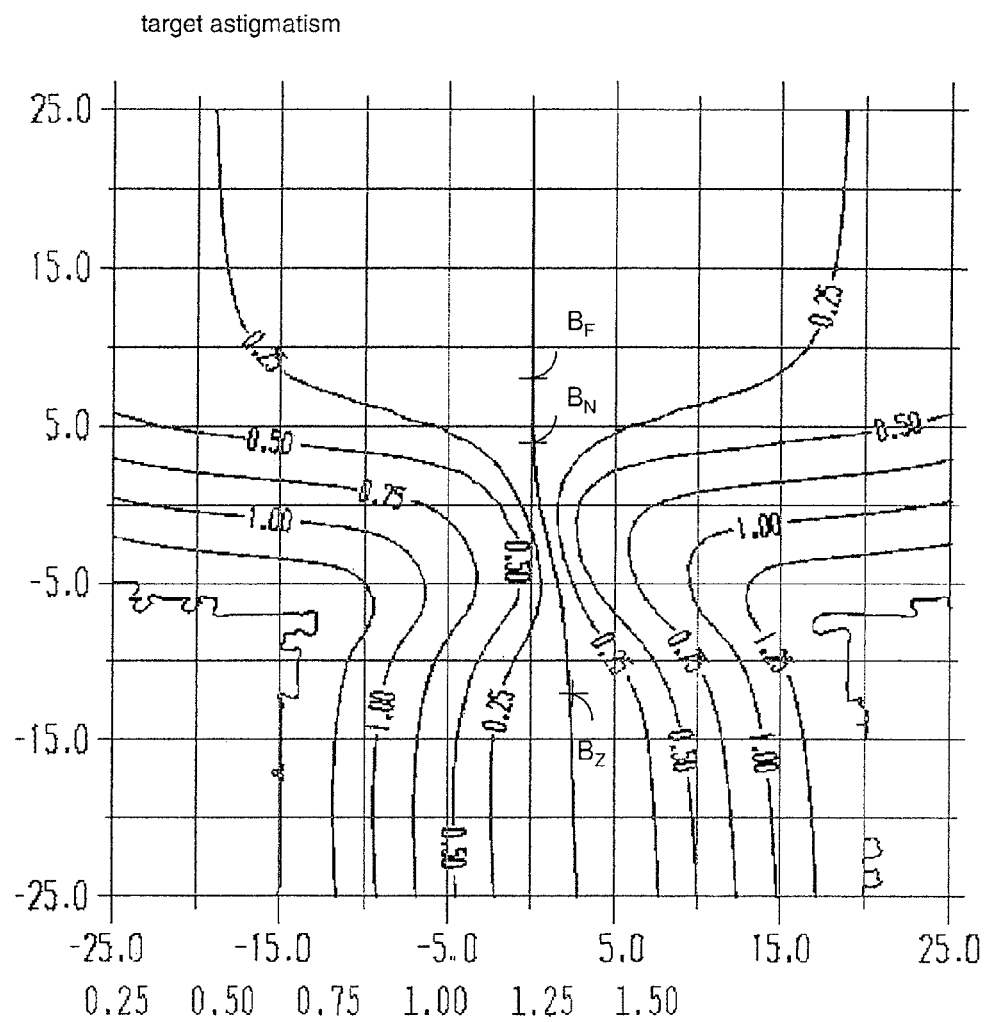
FIG. 2a illustrates an example of a progressive spectacle lens with an addition of 1.5 D showing the design of the spectacle lens.
Figure 2B:
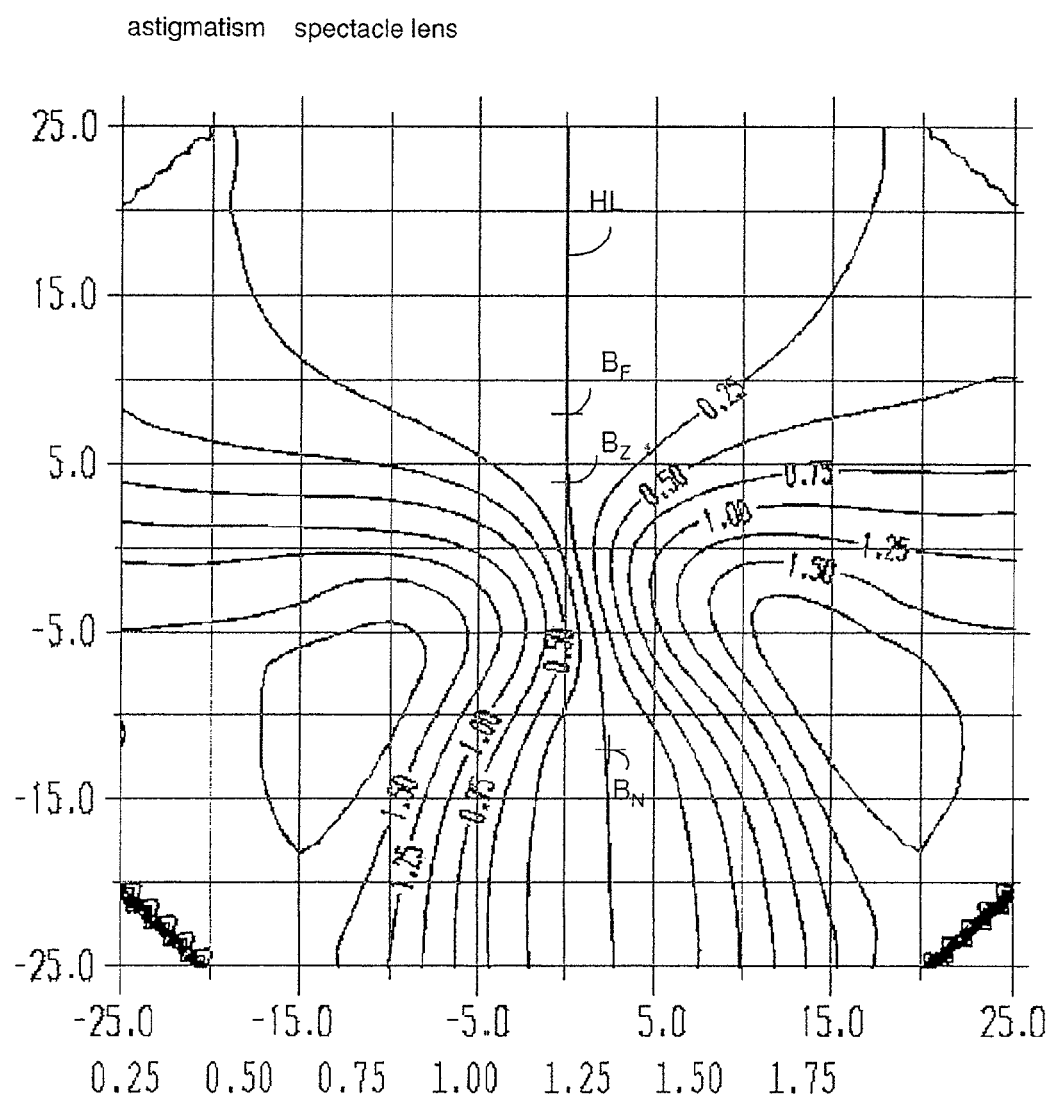
FIG. 2b illustrates an example of a progressive spectacle lens with an addition of 1.5 D showing the actual astigmatism of the spectacle lens.

FIG. 2 shows an example of a progressive spectacle lens with a refractive index of 1.6, an addition of 1.5 D, and a distance portion power of +0.5 D, wherein FIG. 2a shows the desired astigmatism distribution characterizing the design of the spectacle lens, and FIG. 2b shows the actual astigmatism of the spectacle lens optimized according to the design shown in FIG. 2a.

Figure 3A:
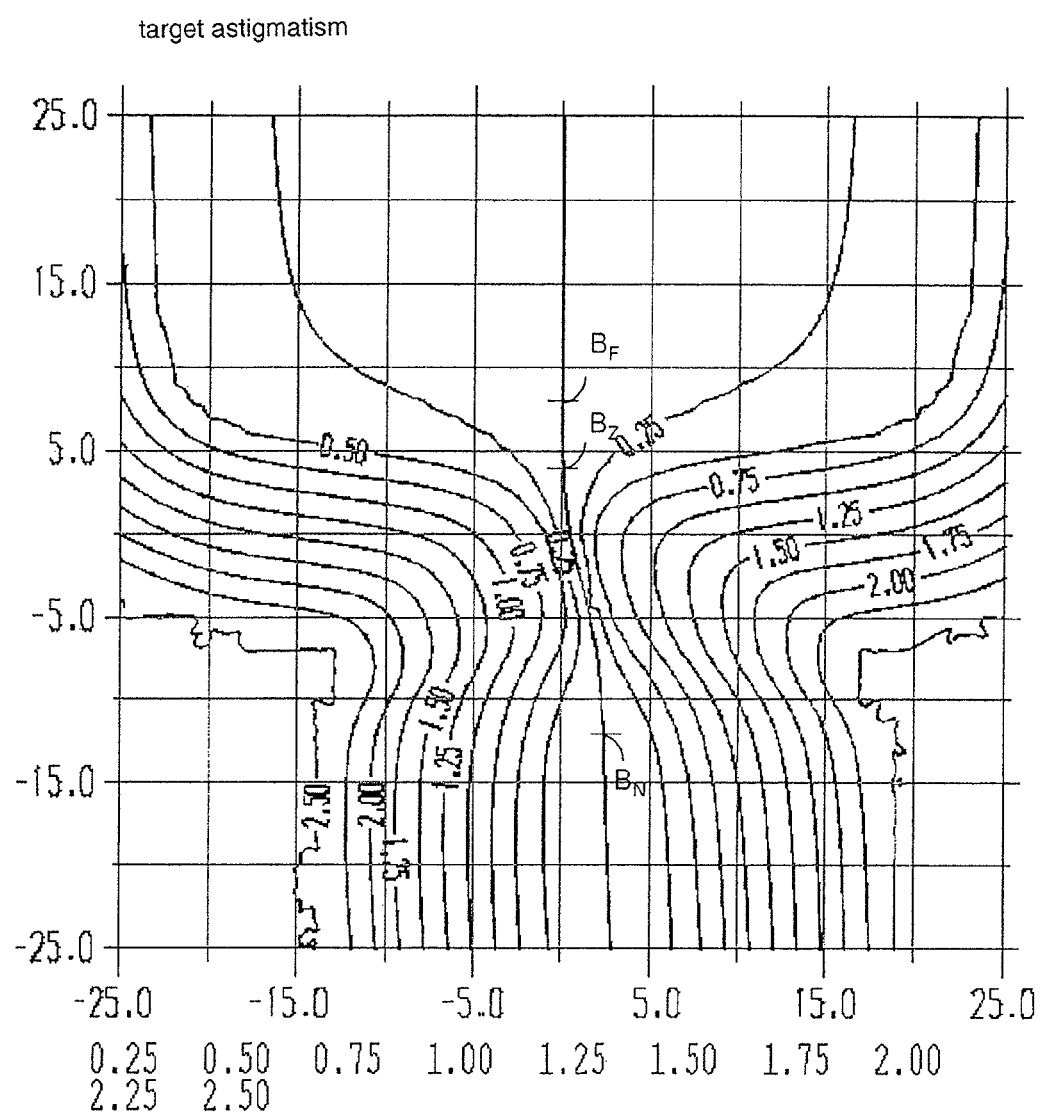
FIG. 3a illustrates an example of a progressive spectacle lens with an addition of 2.5 D, showing the design of the spectacle lens.
Figure 3B:
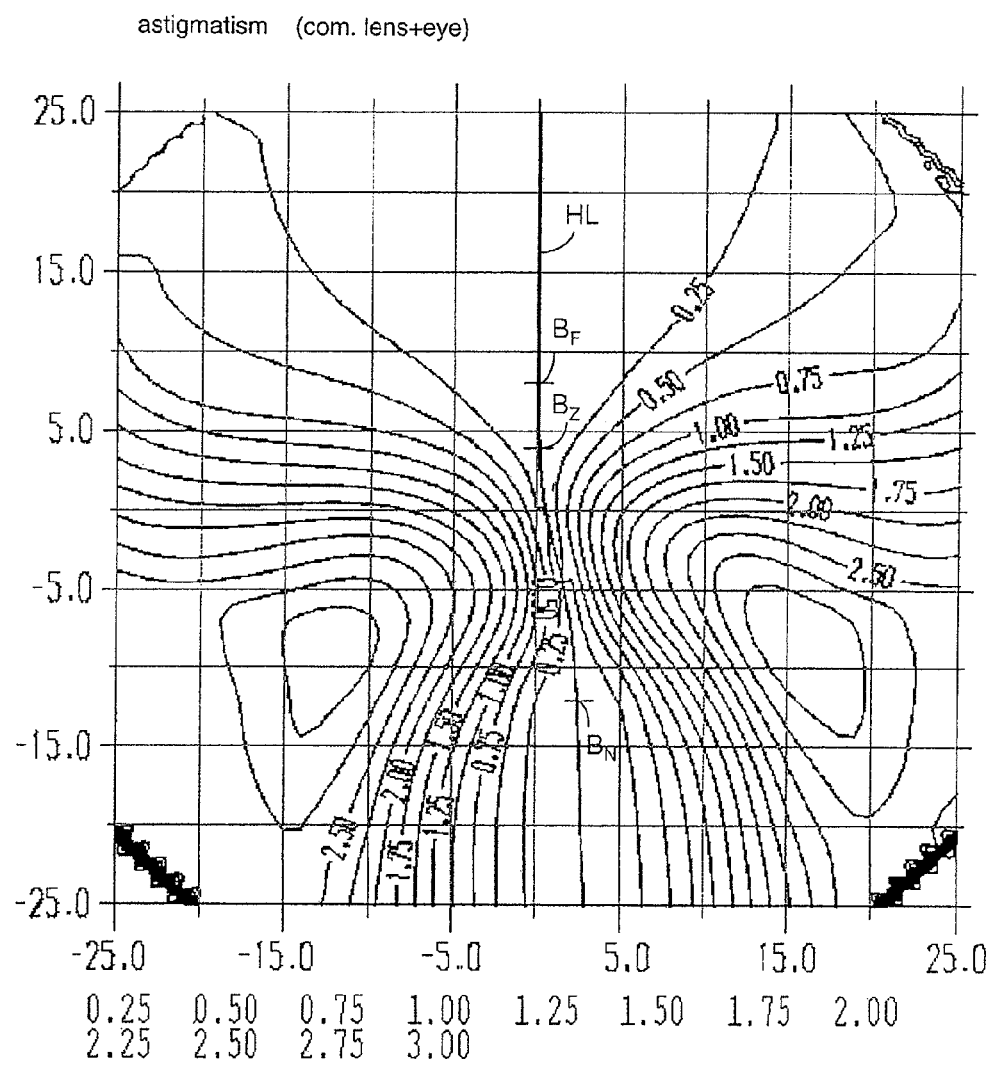
FIG. 3b illustrates an example of a progressive spectacle lens with an addition of 2.5 D, showing the actual astigmatism of the spectacle lens.

FIG. 3 shows an example of a progressive spectacle lens with a refractive index of 1.6, an addition of 2.5 D, and a distance portion power of +0.5 D, wherein FIG. 3a shows the desired astigmatism distribution characterizing the design of the spectacle lens, and FIG. 3b shows the actual astigmatism of the spectacle lens optimized according to the design shown in FIG. 3a.

Figure 4A:
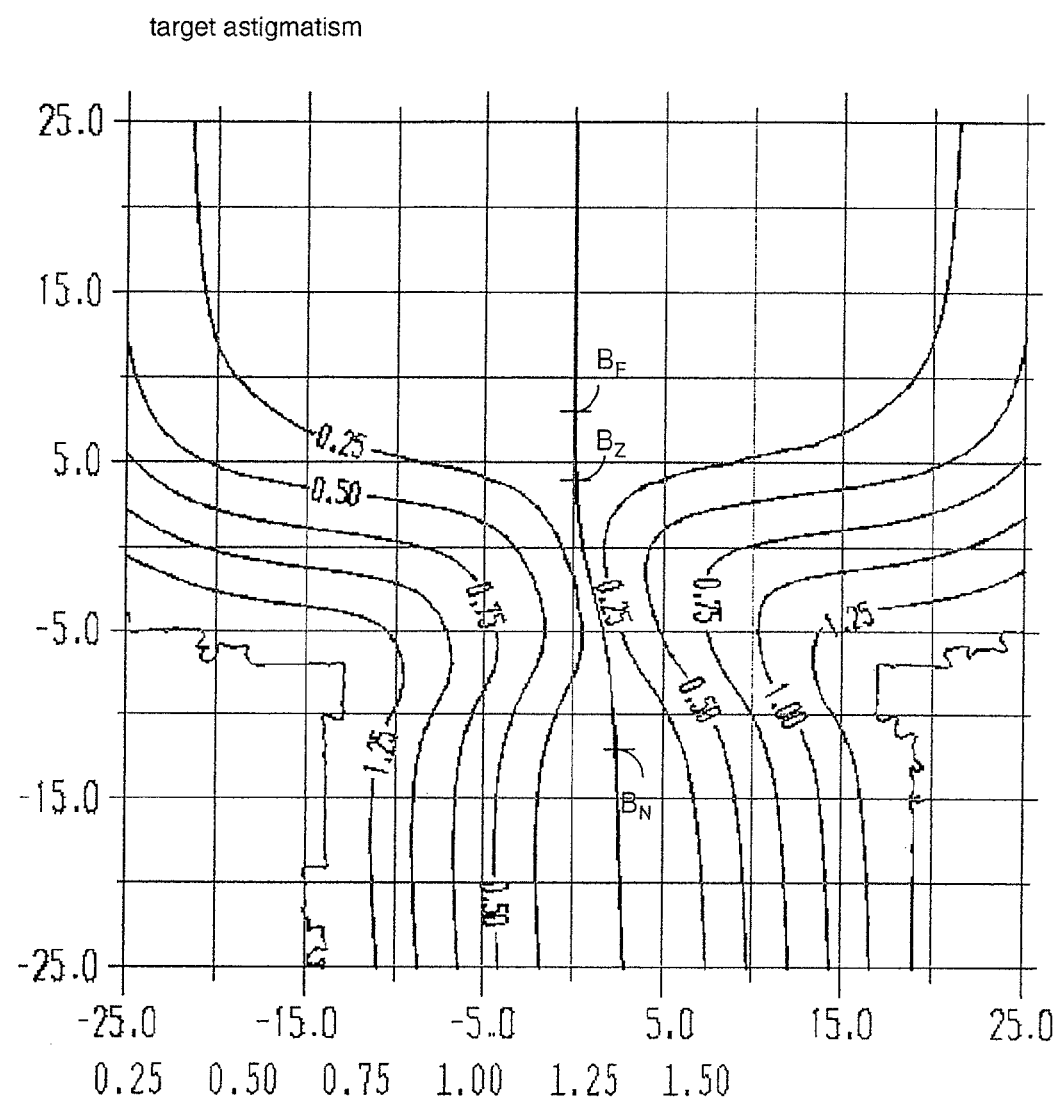
Figure 4B:
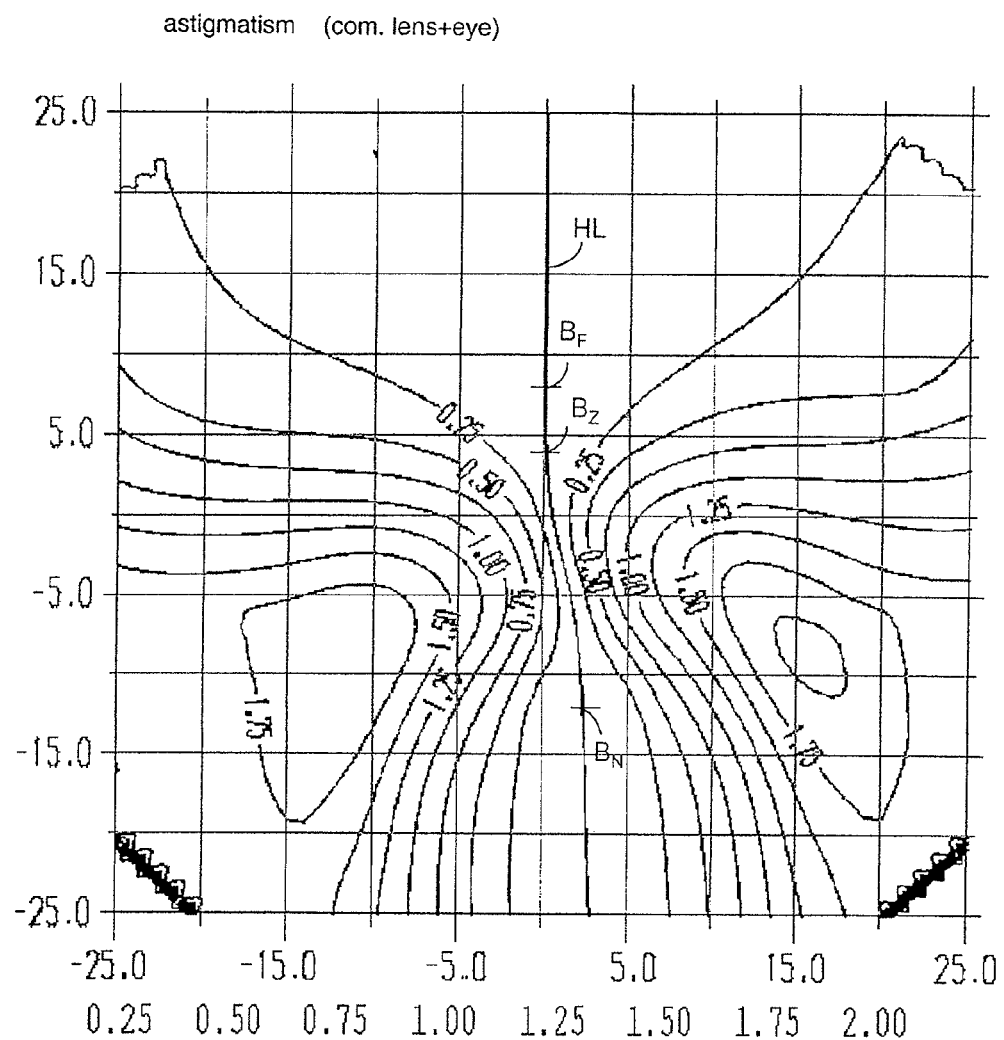
FIG. 4b illustrates an example of a progressive spectacle lens with an addition of 1.5 D, showing the actual astigmatism of the spectacle lens.

FIG. 4 shows an example of a progressive spectacle lens with a refractive index of 1.6, an addition of 1.5 D, and a distance portion power of +0.5 D, wherein FIG. 4a shows the desired astigmatism distribution characterizing the design of the spectacle lens, and FIG. 4b shows the actual astigmatism of the spectacle lens optimized according to the design shown in FIG. 4a. The desired astigmatism distribution shown in FIG. 4a is created with a scaling factor $$s = \frac{1.5}{2.5} = 0.6$$

and t=1 from the desired astigmatism distribution shown in FIG. 3a. Thus, the desired astigmatism distribution shown in FIG. 3a represents the starting or base desired astigmatism distribution.

Figure 5:
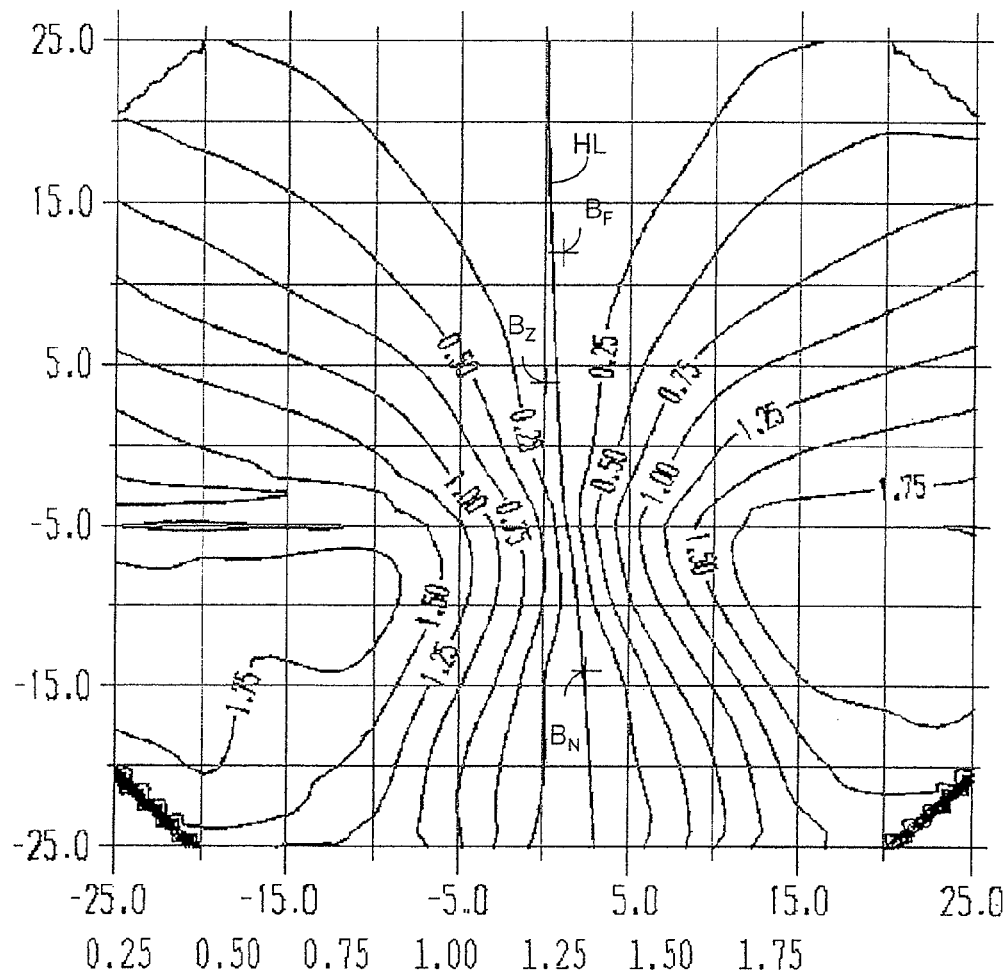
FIG. 5 illustrates an example of a progressive spectacle lens with a base nominal addition of 2.5 D.

FIG. 5 shows the distribution of the actual astigmatism of a progressive spectacle lens with a refractive index of 1.6, a spherical power of +0.5 D, and a nominal addition of 2.5 D. The actual addition of the spectacle lens is 2.1 D.

The spectacle lens shown in FIG. 5 was obtained by minimization of a target function, in which the desired astigmatism distribution according to a starting or base design for a nominal addition of 2.5 D is taken into account as a desired specification. From this starting or base design, further designs or desired astigmatism distributions for further additions are derived by means of multiplication by a scaling factor, and corresponding spectacle lenses are calculated or optimized according to the derived design specifications.

Figure 6A:
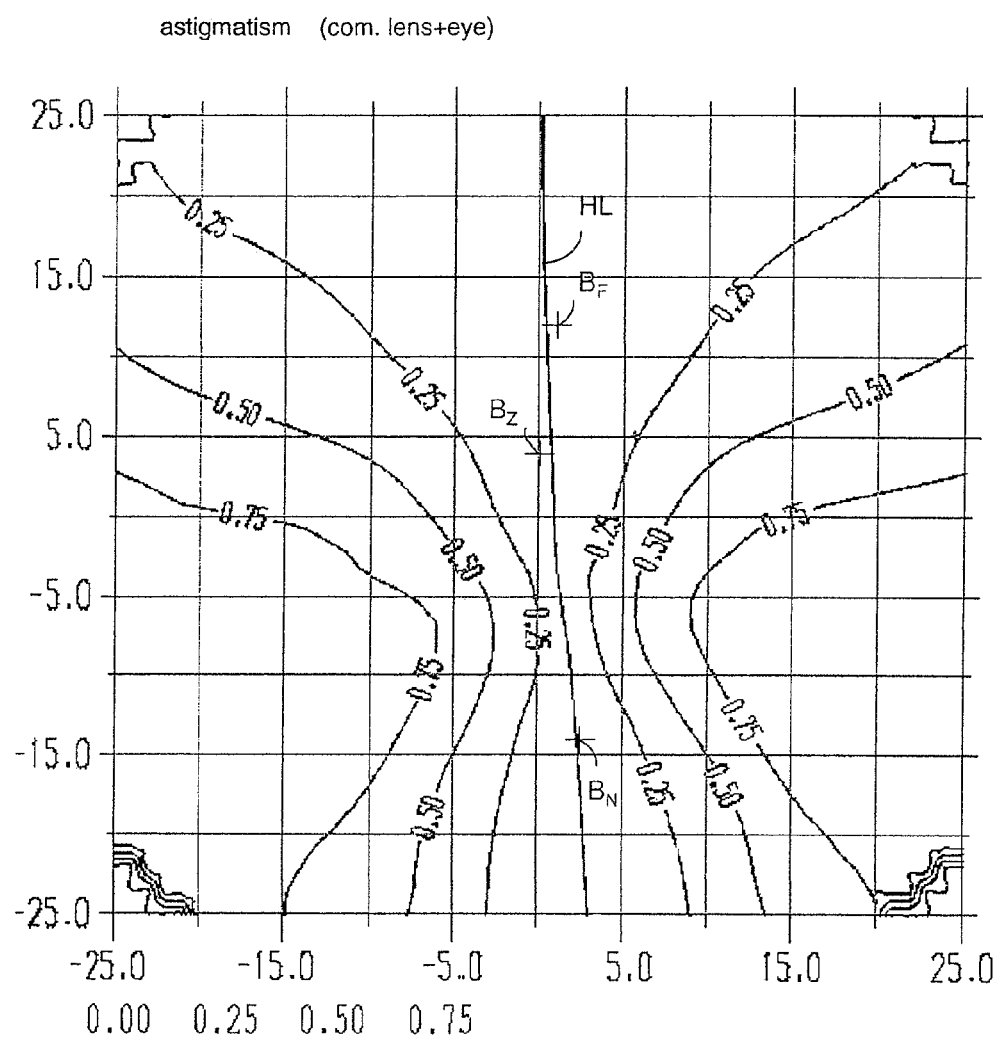
FIG. 6a illustrates an example of a progressive spectacle lens with an addition of 1.25 D.
Figure 6B:
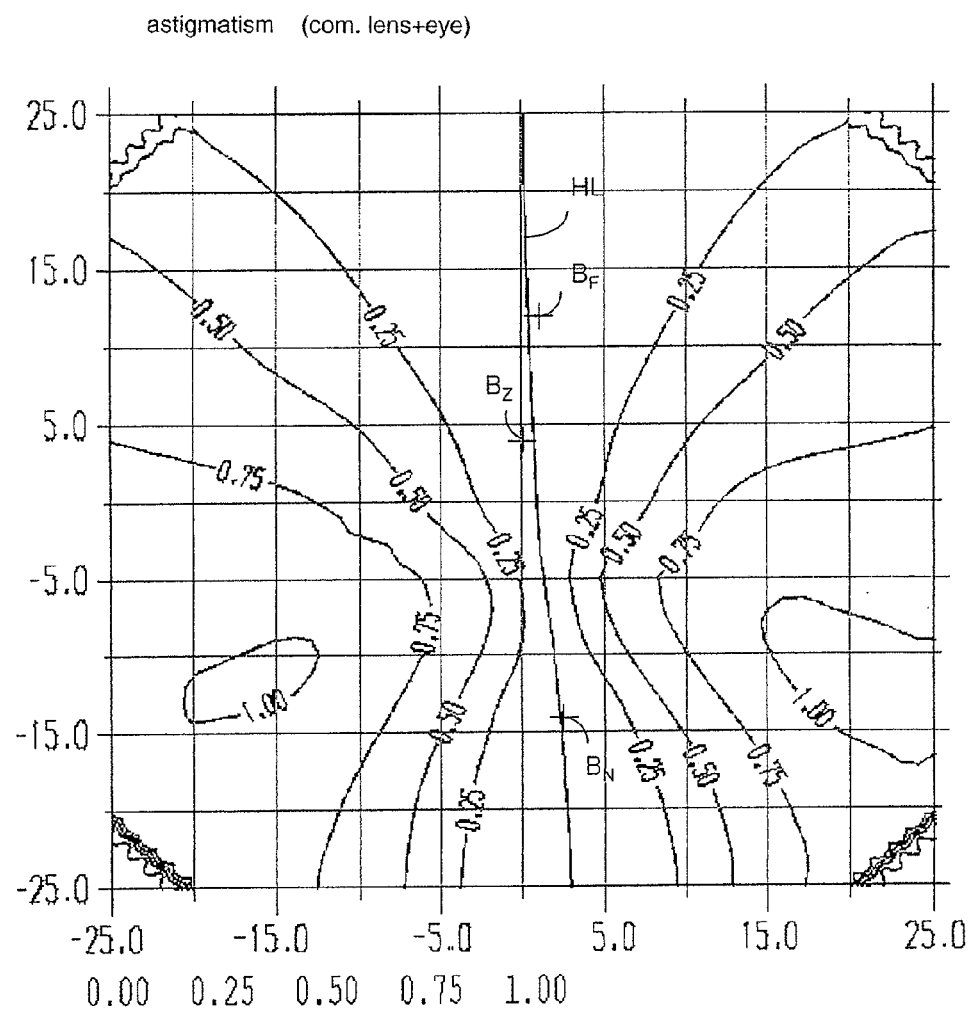
FIG. 6b illustrates a comparative example of a progressive spectacle lens with an addition of 1.25 D.
Figure 7A:
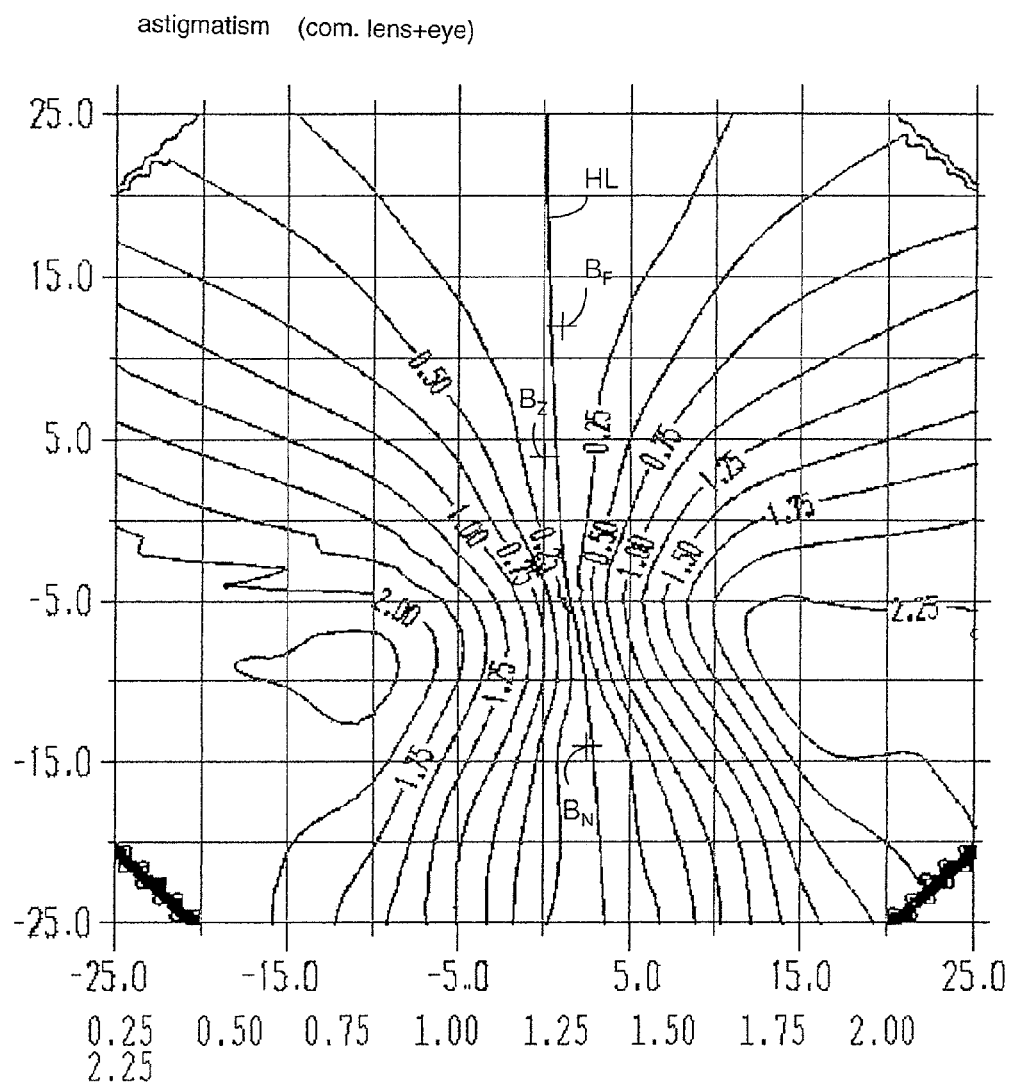
FIG. 7a illustrates an example of a progressive spectacle lens with an addition of 3.0 D.
Figure 7B:
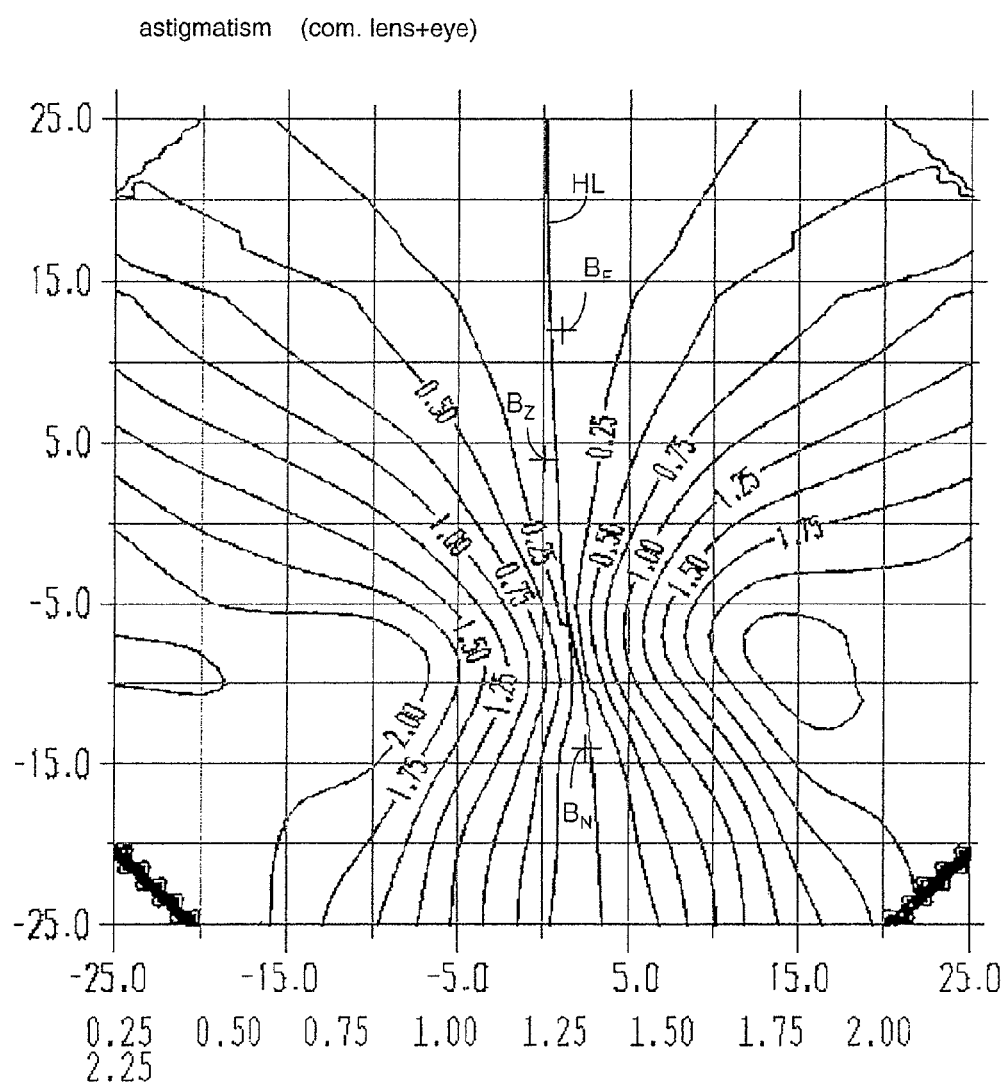
FIG. 7b illustrates a comparative example of a progressive spectacle lens with an addition of 3.0 D.

FIGS. 6a and 7a each show the distributions of the actual astigmatism of two progressive spectacle lenses with an addition of 1.25 D (FIG. 6) and an addition of 3.00 D (FIG. 7a) each, which have been calculated according to the derived design specifications or desired astigmatism distributions. The refractive index and the spherical power of the spectacle lenses shown in FIGS. 6a, 6b, 7a and 7b are equal to the refractive index (1.6) and the spherical power (+0.5 D) of the spectacle lens shown in FIG. 5.

The design or the desired astigmatism distribution for the spectacle lens shown in FIG. 6a was produced or calculated by means of multiplication of the desired astigmatism distribution for the spectacle lens shown in FIG. 5 by a scaling factor $$s = \frac{1.05}{2.1} = 0.5,$$

wherein the actual additions of the respective spectacle lens are taken into consideration in the calculation of the scaling factor s.

The design or the desired astigmatism distribution for the spectacle lens shown in FIG. 7a was produced or calculated by means of multiplication of the desired astigmatism distribution for the spectacle lens shown in FIG. 5 by a scaling factor $$s = \frac{2.6}{2.1} = 1.2,$$

wherein the actual additions of the respective spectacle lens are taken into consideration in the calculation of the scaling factor s.

As can be seen from a comparison of FIGS. 6a and 6b as well as 7a and 7b, the optical properties (in particular actual astigmatism) of the progressive spectacle lenses calculated according to the method of the exemplary embodiments can surprisingly be compared with the optical properties of progressive spectacle lenses that have been calculated by means of a conventional method, i.e. by determining and setting desired astigmatism values specially for each addition.

With the method according to the exemplary embodiments, progressive spectacle lenses can be calculated in a fast, efficient and simple manner for arbitrary additions, and be produced subsequently. Thus, the method is in particular suitable for online calculation and optimization of spectacle lenses to customer order (i.e. according to the specifications of a specific spectacle wearer).

It should be understood that while the foregoing has been described in conjunction with an exemplary embodiment, it is understood that the term "exemplary" is merely meant as an example, rather than the best or optimal. Accordingly, the disclosure herein is intended to cover alternatives, modifications and equivalents, which may be included within the spirit and scope of the disclosed apparatus and method.

Additionally, in the preceding detailed description, numerous specific details have been set forth in order to provide a thorough understanding of the present disclosure. However, it should be apparent to one of ordinary skill in the art that the embodiments described herein may be practiced without these specific details. In other instances, well-known methods, procedures, components, and circuits have not been described in detail so as not to unnecessarily obscure aspects of the disclosure herein.

The invention claimed is:

1. A computer-implemented method for producing or calculating a design for a progressive spectacle lens with an addition Add, wherein the design comprises a desired astigmatism distribution $A_{Add}$ (u, y) for the addition Add, the method comprising:
    setting a starting design including specifications for a course of a principal line, and a starting desired astigmatism distribution $A_{Add_B}$(u, y) for a specified base addition $Add_B$, wherein $Add_B \neq Add$; and
    calculating, using a computer, the desired astigmatism distribution $A_{Add}$ (u, y) for the addition Add by a transformation of the starting desired astigmatism distribution $A_{Add_B}$(u, y),
    wherein the transformation of the starting desired astigmatism distribution $A_{Add_B}$ (u, y) comprises a multiplication $sA_{Add_B}$ (u, y) of the starting desired astigmatism distribution $A_{Add_B}$ (u, y) by a scaling factor s,
    wherein $$s = t\frac{Add}{Add_B},$$

t designates a factor which is a function t=t(Add, F, $Add_B$) of the addition Add, a distance portion power F and the specified base addition $Add_B$, wherein t=1 holds true for Add=$Add_B$, x designates a horizontal coordinate, y designates a vertical coordinate, and u designates a horizontal distance of a point (x, y) from the principal line; and
wherein u=0 holds true on the principal line.

2. The method according to claim 1, wherein $A_{Add}$ (u, y)=$sA_{Add_B}$(u, y).

3. The method according to claim 2, wherein the values of the function t(Add, F, Add $_B$) are determined by a two-dimensional interpolation between predetermined limits of the function t.

4. The method according to claim 1, wherein the values of the function t(Add, F, Add $_B$) are determined by a two-dimensional interpolation between predetermined limits of the function t.

5. The method according to claim 1, wherein t=t(Add, $Add_B$) is a function of the addition and the specified base addition.

6. The method according to claim 1, wherein t=const=1.

7. The method according to claim 1, further comprising adjusting power-specific spectacle parameters, which include at least one of a base curve, a thickness reduction prism, a lens thickness and a refractive power increase.

8. A non-transitory digital storage medium having stored thereon a a computer program with a program code for performing, when loaded and executed on a computer, a method for producing or calculating a design for a progressive spectacle lens of claim 1.

9. A method for manufacturing an individual progressive spectacle lens with an addition Add, the method comprising:
    calculating a design for the progressive spectacle lens with the addition Add according to the method for producing or calculating a design of claim 1; and
    calculating or optimizing the progressive spectacle lens according to the calculated design.

10. The method according to claim 9, wherein the calculation or optimization of the spectacle lens further takes place taking individual data of the spectacle wearer into consideration.

11. A device for manufacturing a progressive spectacle lens with an addition Add, comprising:
    design calculating means for calculating a design for the progressive spectacle lens with the addition Add according to the method for producing or calculating a design of claim 1; and
    optimizing or calculating means for calculating or optimizing the progressive spectacle lens according to the calculated design.

12. A non-transitory digital storage medium having stored thereon a computer program with a program code for performing, when loaded and executed on a computer, a method for calculating and optimizing a spectacle lens, comprising:

calculating a design for the progressive spectacle lens according to the method for producing or calculating a design for a progressive spectacle lens of claim 1;

calculating or optimizing the spectacle lens according to the calculated design.

13. A device for producing or calculating a design for a progressive spectacle lens with an addition Add, wherein the design to be calculated comprises a desired astigmatism distribution $A_{Add}(u, y)$ for the addition Add, the device comprising:

means for specifying a starting design, including specifications for a course of a principal line and a starting desired astigmatism distribution $A_{Add_B}(u, y)$ for a specified base addition $Add_B$, wherein $Add_B \neq Add$; and calculating means for performing a calculation of the desired astigmatism distribution $A_{Add}(u, y)$ for the addition Add by means of a transformation of the starting desired astigmatism distribution $A_{Add_B}(u, y)$, wherein the transformation of the starting desired astigmatism distribution $A_{Add_B}(u, y)$ comprises a multiplication $sA_{Add\ B}(u, y)$ of the starting desired astigmatism distribution $A_{Add_B}(u, y)$ by a scaling factor s, wherein $$s = t \frac{Add}{Add_B},$$

t designates a factor which is a function $t=t(Add, F, Add_B)$ of the addition Add, a distance portion power F and the specified base addition $Add_B$, wherein $t=1$ holds true for $Add=Add_B$, x designates a horizontal coordinate, y designates a vertical coordinate, and u designates a horizontal distance of a point (x, y) from the principal line.

* * * * *